July 1, 1969       E. G. GABBEY       3,452,375
PROCESS FOR PRODUCING SELF-LOCKING SCREW THREADS
Filed May 10, 1967       Sheet 1 of 2
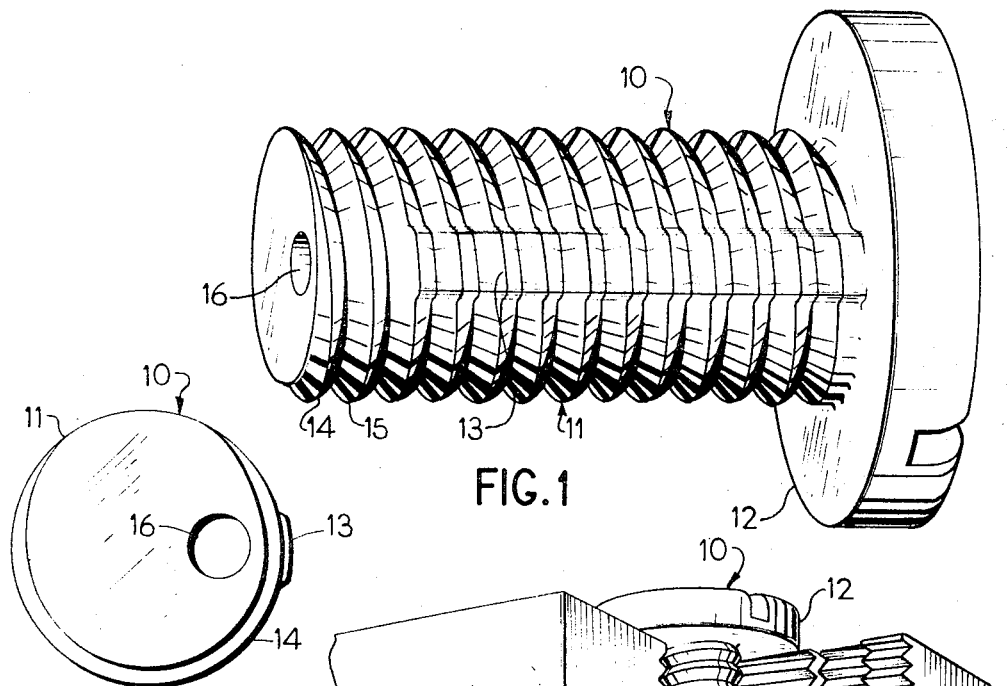
FIG.1
FIG.2
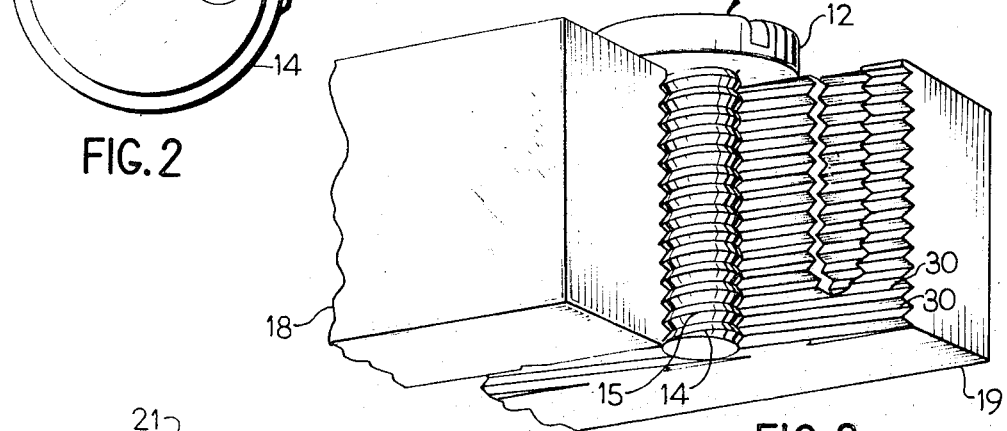
FIG.3
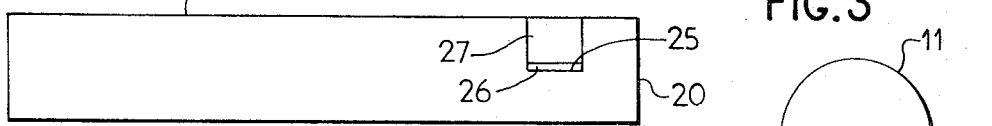
FIG.5
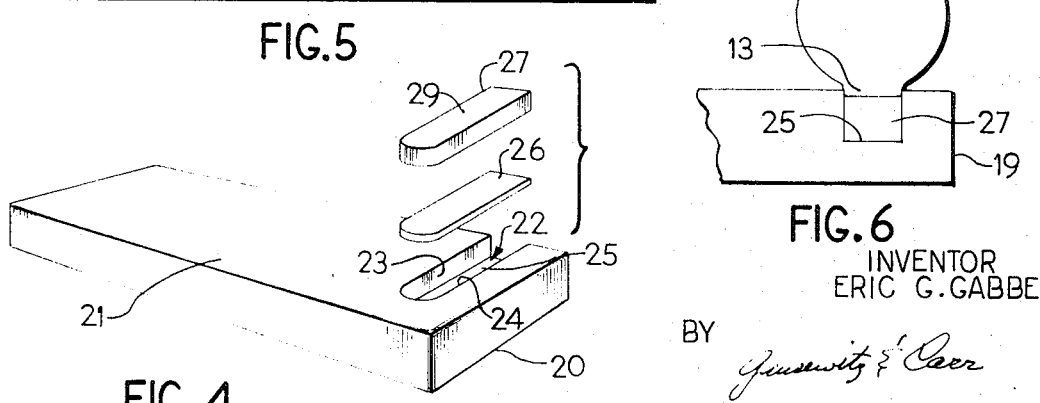
FIG.4
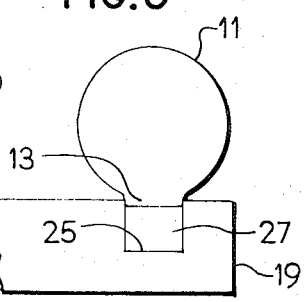
FIG.6
INVENTOR
ERIC G. GABBEY
BY
ATTORNEYS

United States Patent Office 3,452,375
Patented July 1, 1969

1

3,452,375
PROCESS FOR PRODUCING SELF-LOCKING
SCREW THREADS
Eric G. Gabbey, P.O. Box 43271,
Los Angeles, Calif. 90043
Filed May 10, 1967, Ser. No. 637,430
Int. Cl. B21h 3/02; F16b 39/30
U.S. Cl. 10—10                                    9 Claims

ABSTRACT OF THE DISCLOSURE

The method of providing a self-locking threaded fastener in which threads are rolled on the fastener, with a recess being formed in one of the dies causing a localized bulge to be provided on the threads, after which an opening is formed in the fastener adjacent the bulge to provide a relatively thin resilient wall.

BACKGROUND OF THE INVENTION

Field of the invention

This invention relates to locking fasteners.

Description of the prior art

In recent years, particularly for use in fields such as aircraft and missiles, increasingly stringent requirements have been laid down for threaded fasteners. High-performance bolts and screws now are made of stainless steels and new alloys of exceptionally high tensile strength. Frequently, the fasteners are subjected to elevated temperatures, and may be heated to well above 900° F. Very close tolerances are allowed between mating parts. Specifications permit no scratching or thread distortion sufficient to affect the thread efficiencies. This is despte the fact that the fasteners frequently are made of materials which tend to gall when mated.

These requirements have made more difficult the problem of providing a lock arrangement to prevent loosening of the fasteners. Plastic inserts are not usable because of the temperatures encountered. Whatever the thread-locking design, a significant decrease in the strength of the fastener cannot be tolerated. Consequently, the locking arrangement cannot remove much material from any portion of the bolt or screw, because to do so would lower the strength of the fastener. Specifications generally require reusability of the fastener, typically requiring that the fastener be mated and unmated 15 times without reducing below specified torque values. Some thread-locking arrangements are satisfactory initially but fail in the reuse tests, being worn by mating and unmating such that the locking effect largely is lost.

SUMMARY OF THE INVENTION

The present invention provides a method of producing an all-metal thread-locking arrangement capable of meeting the standards set up for high-performance fasteners. By this process, the bolt shank is provided with a resilient localized outward bulge on the threads that presses the opposite side of the bolt into tight wedging engagement with the mating threaded opening. The friction thus produced prevents loosening of the fastener.

The localized bulge is produced readily and economically by a rolling operation when the threads are formed on the bolt shank. To this end, the dies for rolling the threads are provided with a small recessed area. When the screw blank is rolled between the dies to produce the threads, a portion of the shank is extruded into the recess to produce an outward distortion of the threads. After this, a small longitudinally directed hole is drilled in the end of the bolt shank adjacent the bulged portion. This provides the bulge with resilient characteristics. In order to provide for sufficient material to produce the bulged portion, the blank may be contoured such that this is an added amount of material at the portion which is to be deflected into the recess in the die.

In producing the recess in the die, the die blank first may be given a transverse slot by a milling cutter, and into the slot is fitted an insert beneath which is a shim. The insert, backed up by the shim, provides an outer surface flush with the surface of the die blank. Then, the grooves for producing the threads are formed in the surface of the die and the insert as well. After this, the shim is removed and the insert is shifted to the bottom of the slot, leaving a recess having the thread pattern to receive the extruded material of the screw blank.

An object of this invention is to provide an improved method of producing a thread-locking arrangement.

Another object of this invention is to provide a simplified method for producing self-locking bolt and screw threads to close tolerances.

A further object of this invention is to provide a method for producing a self-locking male threaded member which may be made from high tensile strength material and which will not cause galling or become galled upon assembly with a mating part.

Yet another object of this invention is to provide a method for producing a self-locking threaded member capable of reuse without sacrificing its locking characteristics.

An additional object of this invention is to provide a method of producing a self-locking threaded member that is not adversely affected by elevated temperatures.

These and other objects will become apparent from the following detailed description taken in connection with the accompanying drawing.

BRIEF DESCRIPTION OF THE DRAWING

FIGURE 1 is a perspective view of a threaded fastener made in accordance with the process of this invention;

FIGURE 1 is an end elevational view of the fastener of FIGURE 1;

FIGURE 3 is a perspective view, partially broken away, illustrating the rolling of the threads on the fastener of FIGURE 1;

FIGURE 4 is an exploded perspective view of the components utilized in making the die having a recess;

FIGURE 5 is a side elevational view showing the components of FIGURE 4 in their assembled relationship;

FIGURE 6 is a side elevational view, partially broken away, showing the forming of the bulged portion of the threads of the fastener;

DESCRIPTION OF THE PREFERRED EMBODIMENTS

Figure 15:
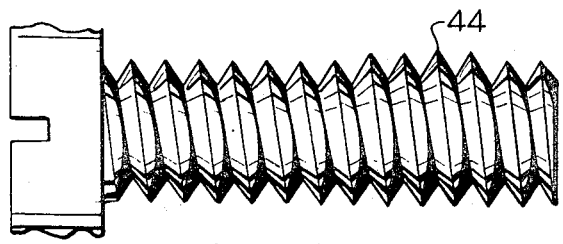
FIGURE 15 is a side elevational view of the fastener formed from the blank of FIGURES 13 and 14.

The method of this invention is used to produce a bolt or screw 10, such as is shown in FIGURE 1, which has a threaded shank 11 projecting outwardly from a slotted head 12. Extending longitudinally for a substantial portion of the length of the shank 11 is a localized outward bulge 13 on the threads. Generally, it is preferred to leave the two end thread convolutions 14 and 15 in the standard shape without the bulge 13 to facilitate entry of the shank 11 into the mating part.

A longitudinally extending hole 16 is drilled in the shank 11 adjacent the bulged portion 13. The opening is drilled inwardly from the shank end to a depth such that the opening parallels the entire length of the bulged portion. The opening 16 is off-center from the axis of the shank 11 and made relatively small. Very little material of the shank is removed because of the small size of the aperture 16, so that the strength of the bolt or screw is not diminished materially. The presence of the opening 16 provides the bolt shank with a relatively thin wall adjacent the opening and imparts a resilient characteristic to the bulged portion 13. Thus, because of the thin wall resulting from the aperture 16, the bulged portion may be deflected inwardly toward the axis of the shank 11, and then will spring back to its original shape.

As a result of this construction, when the shank 11 enters a mating threaded opening, the outward bulge 13 bears against the wall of the opening and pushes the shank 11 laterally toward the opposite side. This wedges the threads on the side opposite from the bulge into firm engagement with the threads of the mating opening at that location. Consequently, greater torque is required to rotate the bolt or screw relative to the mating part, and a locking effect is realized. The fact that the bulge 13 is resilient not only enhances the locking action, but also means that it will not become worn unduly from repeated use of the fastener, so that the locking effect is retained. Moreover, the parts do not become galled when the fastener is mated and unmated.

The threads are produced on the part through a rolling operation, as illustrated in FIGURE 3, which produces a threaded part within close tolerances. Thus, the screw blank is turned between dies 18 and 19, which have opposed surfaces provided with V-shaped grooves that result in the production of threads on the shank. Normally, flat dies are employed, although curved or circular dies also can be used. The die 18 may be conventional in contour. The die 19, however, has a recessed portion into which the shank is extruded in forming the bulge 13.

The blank 20 for producing the die 19 is illustrated in FIGURE 4. The die blank is a rectangular-shaped piece of metal having a flat upper surface 21. In this surface is cut a relatively narrow transverse slot 22 having a length less than the width of the die blank. The slot 22 has parallel side edges 23 and 24 and a flat bottom surface 25 parallel to the outer surface 21.

In addition, there are provided a shim 26 and an insert 27. These members are complementary to the slot at their edges and together fill the slot 22 when introduced into it. Thus, as seen in FIGURE 5, the flat shim 26 and the insert 27 are placed into the slot 22, and the outer surface 29 of the insert is made flush with the surface 21 of the die blank. After this, the V-shaped grooves 30 are formed in the surface 21 of the die blank in the conventional manner. The grooves 30 extend through the surface 29 of the insert 27 as well as the die surface 21.

Next, the shim 26 is removed, and the insert 27 is pushed downwardly against the bottom surface 25 of the slot 22. The result is a shallow recess in the surface 21 of the die, with the thread contour being defined at the bottom of the recess. Consequently, when the shank is rolled between the dies 18 and 19, a longitudinal portion of the shank will be extruded into the recess above the insert 27. This produces the bulge 13. When the shank of the screw is deflected into the recess, the grooves 30 in the surface of the insert preserve the thread contour so that the bulge resembles the remaining threads on the shank, but is distorted outwardly. It is after the rolling operation that the opening 16 is formed in the shank 11.

The groove 22 is made shorter than the length of the shank of the blank used to form the bolt or screw 10. Therefore, when the screw blank hangs downwardly between the dies 18 and 19 during the rolling operation, the lower end of the shank extends below the recess in the die 19. As a result, this end portion of the blank is not extruded into the recess. Thus, the end thread convolutions 14 and 15 are made to the contour of the ordinary thread without the bulge.

Figure 9:
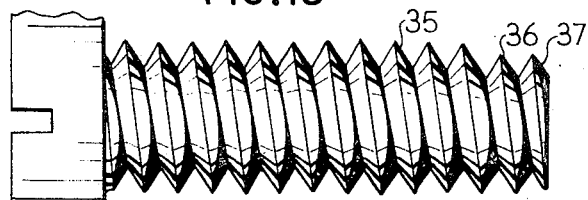
FIGURE 9 is a side elevational view of the fastener formed from the blank of FIGURES 7 and 8.
Figure 10:
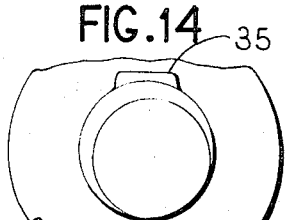
FIGURE 10 is an end elevational view of the fastener of FIGURE 9.
Figure 7:
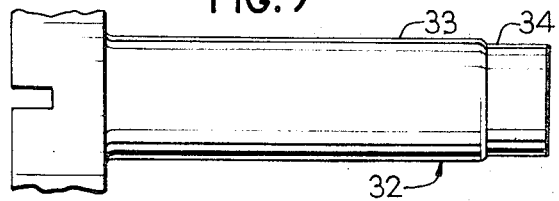
FIGURE 7 is a side elevational view of a blank used in forming a threaded fastener in accordance with the teachings of this invention.
Figure 8:
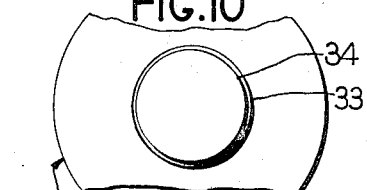
FIGURE 8 is an end elevational view of the blank of FIGURE 7.

In order to form a screw shank to close tolerances with a bulged portion included, there should be a provision for enough stock in the blank to permit the extrusion into the recess where the bulge is formed. This may be accomplished by the arrangement shown in FIGURES 7 and 8. Here, the screw blank 32 includes a first portion 33 of larger diameter than that of a shorter end portion 34. When placed between the thread-rolling dies, the section 33 extends for a length corresponding to the length of the slot 22. Therefore, as the blank is rolled between the dies, there is extra material at the part of the blank where the bulged portion is to be formed. The amount of increased diameter in the section 33 is correlated to the depth of the recess and to the size of the bulge to be formed. As a result, there is just adequate material to fully enter the recess and form the bulge. The result may be seen in FIGURES 9 and 10, where longitudinal bulge 35 extends for the length of what originally was the portion 33 of the screw blank. End convolutions 36 and 37 are formed in the shorter and narrower portion 34 of the blank, which does not enter the recess. Consequently, the end convolutions 36 and 37 are the same as the normal contour of the thread being produced.

Figure 11:
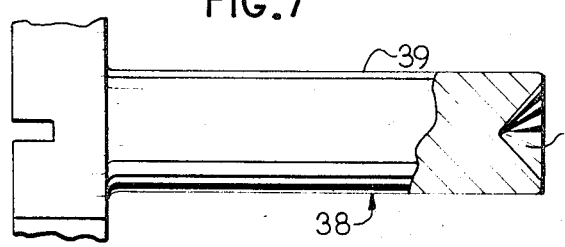
FIGURE 11 is a side elevational view, partially in section, of a modified form of the blank for forming the threaded fastener.
Figure 12:
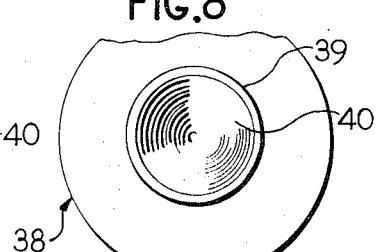
FIGURE 12 is an end elevational view of the blank of FIGURE 11.

Another means of accomplishing this result may be seen in FIGURES 11 and 12. Here, the screw blank 38 has a cylindrical shank portion 39 of constant exterior diameter. However, there is a conical recess 40 extending longitudinally inwardly from the end of the section 39 of the screw blank. This means that there is less material at the outer end of the blank than at the inner portions which are to be rolled into the recess in forming the bulge. The end portion, where the recess 40 is located, is compressed inwardly, substantially filling up the recess 40 as it is pressed between the normal die faces outwardly of the recessed portion.

Figure 16:
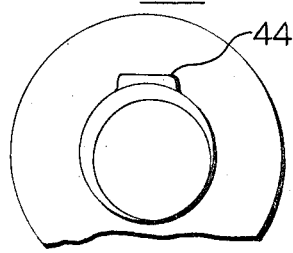
FIGURE 16 is an end elevational view of the fastener of FIGURE 15.
Figure 13:
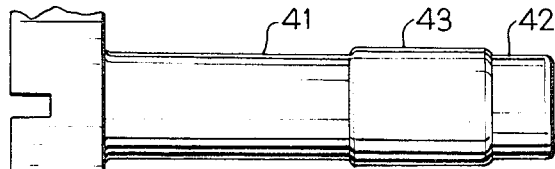
FIGURE 13 is a side elevational view of a further modification of the blank for forming the threaded fastener.
Figure 14:
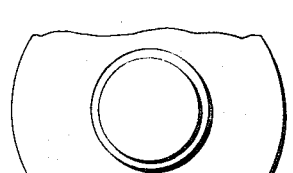
FIGURE 14 is an end elevational view of the blank of FIGURE 13.

In some instances it may be desired to have the bulged portions extend for less than the full length of the shank of the screw or bolt. When this is done, the arrangement of FIGURES 13 and 14 can be resorted to. Here, the blank includes sections 41 and 42 on either side of a larger portion 43. The bulge will be formed for the length of the portion 43, while the sections 41 and 42 are given the normal thread contour. The result of the forming of this type of blank may be seen in FIGURES 15 and 16, where the bulge 44 is intermediate the ends. While the end results are fully satisfactory with this arrangement, it is more difficult to produce the blank of FIGURES 13 and 14 than it is the one of FIGURES 7 and 9.

Generally, the bulge on the screw shank is formed by a single die recess, as described above. It is possible, also, to form the bulge progressively by rolling the screw blank across recesses of gradually increasing depth in the die face. These recesses are spaced with relation to the diameter of the blank such that the same part of the shank extends across each recess as it is encountered. Such progressive extrusion of the bulge is used primarily for screw blanks of particularly hard material.

The foregoing detailed description is to be clearly understood as given by way of illustration and example only, the spirit and scope of this invention being limited solely by the appended claims.

I claim:

1. The method of producing a self-locking threaded member comprising the steps of
   rolling a screw blank of resilient material to produce a thread on the exterior thereof,
   rolling an exterior localized bulge on said threads,
      thereby transforming said blank into an exteriorly threaded member,
   and then forming an opening in said member adjacent said localized bulge for providing a relatively thin wall adjacent said bulge and imparting resilience to said bulge.

2. The method of producing a self-locking threaded member comprising the steps of
   providing die means with a pattern to produce a thread upon rolling of a blank against said die means,
   recessing a localized portion of said pattern of said die means,
   then rolling a blank of resilient material against said die means to produce a thread thereon while deflecting a portion of said blank into said recessed portion of said die means,
      thereby transforming said blank into a threaded member having a localized bulge on the threads thereof,
   and then providing an aperture in said threaded member adjacent said bulge to provide a relatively thin wall at said bulge and impart resilience to said threaded member at said bulge.

3. The method in accordance with claim 2 including in addition the steps of
   providing said blank with first and second portions with said first portion having more material than said second portion,
   and deflecting said first portion into said recessed portion of said die means during said rolling of said blank while maintaining said second portion remote from said recessed portion,
      for utilizing the greater amount of material at said first portion in producing said localized bulge.

4. The method in accordance with claim 3 in which said second portion of said blank is provided at one end thereof.

5. The method in accordance with claim 3 in which, for providing more material at said first portion than said second portion, said second portion is provided with recess means therein.

6. The method of producing a self-locking threaded part comprising the steps of
   providing a pair of opposed substantially flat dies having longitudinally extending grooves therein defining a pattern for producing screw threads on a part rolled therebetween,
   recessing locally a portion of said pattern of one of said dies,
   then rolling a screw blank of resilient material between said dies to produce a thread thereon while deflecting a portion of said blank into said recess,
      thereby to obtain a bulge on said threads and transform said screw blank into a threaded member,
   and then providing a relatively small aperture in said threaded member offset from the axis thereof and adjacent said bulge for resulting in a relatively thin wall at said bulge and imparting resilience to said threaded member at said bulge.

7. The method of providing a self-locking threaded member comprising the steps of
   providing die means with a pattern to produce a thread upon rolling of a blank against said die means,
   recessing a portion of said pattern of said die means,
   preparing a screw blank of resilient material so as to have a first portion of a relatively small amount of material and a second portion of a relatively large amount of material,
   then rolling said blank against said die means to produce a thread thereon with said second portion being rolled over said recess for deflecting material of said blank into said recess,
      thereby to produce a localized bulge on said blank and transform said blank into a threaded member,
      said first portion of said blank being remote from said recess upon said rolling of said blank,
   and then providing an aperture in said threaded member adjacent said bulge to provide a relatively thin wall at said bulge and impart resilience to said threaded member at said bulge.

8. The method as recited in claim 7 in which for said die means there are provided a duality of opposed dies and for recessing a portion of said pattern of said die means there are included the steps of
   providing a transverse recess in one of said dies,
   then filling said recess with first and second members complementary thereto with said second member facing the exterior of said recess,
   then forming said pattern on said one die and said second member,
   and then removing said first member from said recess and moving said second member to the bottom of said recess,
      thereby to provide said pattern in said recess.

9. The method of providing a self-locking threaded part comprising the steps of
   providing opposed relatively flat die means having longitudinally extending grooves defining a pattern for producing a thread on a part rolled therebetween,
   providing a transverse recess in said pattern of one of said die means extending less than the full width of said die means,
   preparing a screw blank of resilient material having a cylindrical shank,
      said cylindrical shank being give a first portion of relatively large diameter and a second portion of a relatively small diameter,
         said first portion being given a length substantially the same as the length of said recess,
   then rolling said cylindrical shank of said blank between said die means with said first portion being rolled across the recess thereby to deflect the material of said blank into said recess,
      thereby to provide threads on said cylindrical shank and produce a localized bulge on said threads where said material was so deflected into said recess while maintaining said second portion of said blank remote from said recess during said rolling, and then drilling an aperture in said threaded member with said aperture extending longitudinally thereof adjacent said bulge for providing a relatively thin wall at said bulge and imparting a resilience to said threaded member at said bulge.

References Cited

UNITED STATES PATENTS

| | | | |
|---|---|---|---|
| 2,284,659 | 6/1942 | Hosking | 72—88 |
| 2,856,617 | 10/1958 | Widmann | 10—10 |
| 3,044,329 | 7/1962 | Seibert | 72—90 |
| 3,163,196 | 12/1964 | Hanneman | 72—88 X |
| 3,245,096 | 4/1966 | McKay et al. | 10—10 |
| 3,308,645 | 3/1967 | Hampton | 72—88 X |
| 3,358,726 | 12/1967 | Gabbey | 10—10 X |

MILTON S. MEHR, *Primary Examiner.*

U.S. Cl. X.R.

72—88, 469; 85—48; 151—22